March 6, 1951

G. D. McCARTHY ET AL 2,544,541

PROTECTIVE SEAL

Filed Dec. 19, 1946

INVENTOR.
George D. McCarthy
Arthur H. Edwards
BY
Harness and Harris
ATTORNEYS

Patented Mar. 6, 1951

2,544,541

UNITED STATES PATENT OFFICE 2,544,541

PROTECTIVE SEAL

George D. McCarthy, Detroit, and Arthur H. Edwards, Highland Park, Mich., assignors to Chrysler Corporation, Highland Park, Mich., a corporation of Delaware Application December 19, 1946, Serial No. 717,228

1 Claim. (Cl. 286—29)

This invention relates to means for sealing the opening in a housing where the opening is penetrated by a member adapted to move relative to the housing.

A typical application of this invention is found in the boot of a hydraulic brake cylinder. This will be used as an example to describe the invention although it is to be understood that other applications thereof can be made.

Hydraulic brake cylinders are provided with a piston adapted to reciprocate in the cylinder. The ends of the cylinder are open and a piston rod or brake shoe extension customarily penetrates the open end of the housing for engagement with the piston. The open ends of the cylinder are customarily sealed with a flexible boot which encircles the piston rod or brake shoe extension and encircles the end of the cylinder. The flexible nature of the boot permits relative movement to occur between the brake shoe extension and cylinder. These boots are provided in an effort to seal the cylinders from the entrance of water and dirt.

It is an object of the invention to provide a boot that has an improved seal on the cylinder. The edge of the boot which engages the cylinder is molded with an internal diameter that is less than the external diameter of the cylinder so that increased tension is obtained on the sealing edge. A maximum contact area between the boot and cylinder is also provided.

It is a further object of the invention to provide a boot design that localizes deformation of the boot when assembled to specific areas where it serves a useful purpose.

A relatively thin diaphragm portion is provided and the boot is so constructed that all flexure of the boot required to accommodate relative movement between the rod and cylinder occurs in the diaphragm.

It is an additional object of the invention to increase the effective life of the boot and to provide a boot which is unlikely to be accidentally disengaged from the cylinder.

Figure 1:
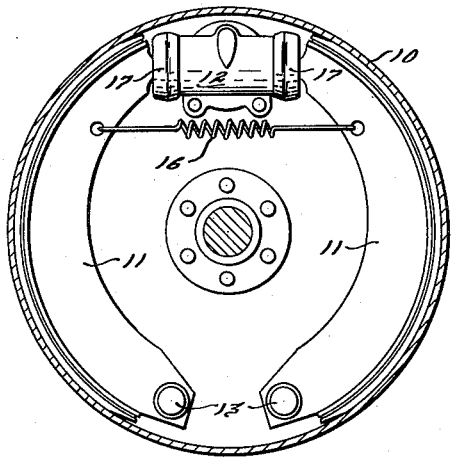
Fig. 1 is a vertical elevation of an automotive brake having a hydraulic cylinder equipped with the novel sealing means.

In Fig. 1 a conventional vehicle brake comprising a drum 10, brake shoes 11, and hydraulic brake cylinder 12 is illustrated. The brake shoes are pivoted at 13 and when the brakes are applied, fluid is forced into cylinder 12 through conduit, not shown. A pair of pistons 14 are slidably mounted in cylinder 12 and adapted to be moved outwardly in cylinder 12 when the brakes are applied. Brake shoes 11 are provided with extensions 15 which are retained in engagement with the pistons 14. Outward movement of the pistons 14 forces the brake shoes 11 into engagement with the brake drum 10. The spring 16 returns the shoes to their disengaged position when the fluid pressure is decreased.

Each end of the brake cylinder 12 in Fig. 1 is sealed with a boot 17. The cylinder 12 is provided with an annular groove 18 adapted to locate the boot 17. The brake shoe extensions 15 are provided with recessed portions 19 which serve to locate the associated ends of the boots 17.

Each boot 17 is formed of a resilient material. The boot is preferably formed of molded rubber although it is to be understood that other plastic materials may be substituted without departing from the invention.

Each boot 17 is provided with a diaphragm portion 20 which has very thin walls. The central portion of the diaphragm 20 is provided with an opening 21 and a relatively thick ring 22 or hub bordering the opening. The opening 21 may be circular or of any contour required to effectively seal the element which penetrates the cylinder. In the form illustrated, the brake shoe extension 15 has a rectangular cross section and, therefore, the associated hub 22 and opening 21 are rectangular. The hub 22 is adapted to be positioned in the recessed portions 19 of the brake shoe extension 15 and to resiliently engage the extension 15 and its periphery.

Figure 2:
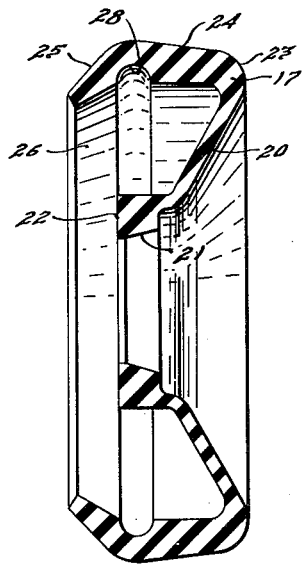
Fig. 2 is a vertical section of the boot prior to installation on the hydraulic cylinder.
Figure 4:
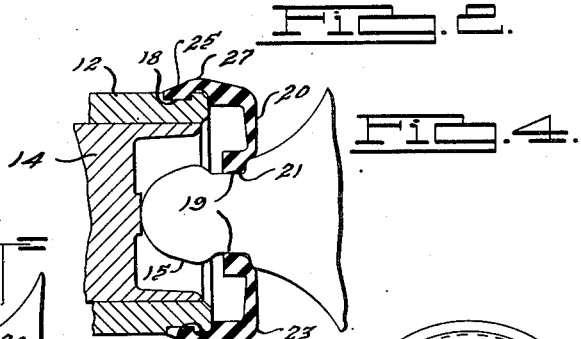
Fig. 4 is a view similar to Fig. 3 showing the position of the parts when the brake is engaged.
Figure 3:
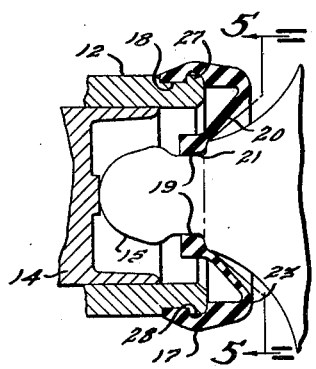
Fig. 3 is a partial elevation in section showing the position of the assembled boot when the brake is disengaged.
Figure 5:
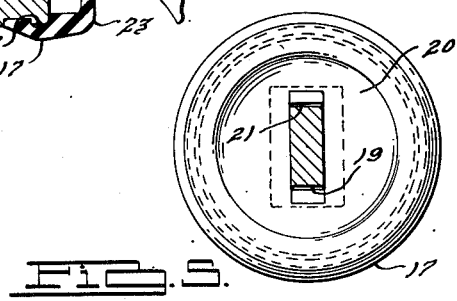
Fig. 5 is an end elevation on the line 5—5 of Fig. 3.

The outer or rim portion of the boot 17 is provided with relatively thick walls which extend axially rearwardly from the diaphragm 20. The thickened wall portion includes the leading edge 23 of the boot. This thickened edge is provided so that injuries to the boot which most frequently occur at the leading edge during assembly and transportation will not puncture the boot. The relatively thick rearwardly extending rim portion 24 has an internal diameter substantially equal to the external diameter of the cylinder 12 with which it is to be assembled. The terminal portion 25 of the rim portion forms a lip which extends inwardly at an inclination to the axis of the boot so that the internal diameter of the boot at the extreme left side of Fig. 2 is materially smaller than the external diameter of the cylinder 12. During assembly of the boot on the cylinder the lip 25 must be stretched and placed under considerable tension to assemble it over the end of the cylinder 12. Only the lip 25 is distorted during assembly and the balance of the rim portion 24 is not disturbed. The terminal portion 25 is provided with a frusto-conical surface 26. The surface 26 is provided with a width substantially equal to the width of the annular slot 18 in cylinder 12. When the edge of the boot is stretched and the surface 26 positioned in the annular slot 18, it is retained therein under considerable tension. The terminal portion 25 is preferably tapered so that upon assembly the outer surface of the boot is substantially flush with the outer surface of the cylinder adjacent the annular groove 18. The absence of any material protruding portion on the boot minimizes any accidental disassembly that might be caused by collision of a foreign object with the boot. The cylinder 12 is preferably provided with an annular shoulder 27 adjacent the groove 18. The boot may be provided with a grooved portion 28 which is adapted to receive the annular shoulder to prevent the boot from sliding axially on the cylinder 12. The grooved portion 28 also serves to reduce the wall thickness and provide a fulcrum about which the lip 25 may bend.

The great tension in and the width of the lip 25 serve to provide an effective seal and to prevent removal of the boot. The fact that the tension is confined to the lip 25 prevents distortion of the boot and consequent leakage. The relatively thin walls of the diaphragm portion 20 combined with the relatively thick wall of the rearwardly extending portion 24 and the localized distortion of the terminal portion 25 permit the diaphragm 20 to flex without transmitting the movement to the lip 25 which is in engagement with the cylinder. Previous boot constructions have been objectionable in that the sealing edge rocked on the cylinder. The extreme deformation required in the lip 25 for assembly of the boot on the cylinder increases the effective life of the boot. Constructions which require a minimum amount of deformation are objectionable in that the permanent set of the rubber becomes equal to the deformation after a relatively short time and the residual stress tending to keep the boot on the cylinder becomes negligible.

Although but one embodiment of the invention is herein shown and described, it will be understood that various changes in the size, shape and arrangement of parts may be made without departing from the spirit of our invention and it is not our intention to limit said invention other than by the terms of the appended claim.

We claim:

A resilient boot element for forming a seal between relatively stationary and shiftable members, comprising an inner hub element for receiving said shiftable member, an intermediate flexible diaphragm extending outwardly from said hub element, a relatively rigid peripheral flange on the outer extremity of said diaphragm, said flange having an internal diameter smaller than the external diameter of said stationary member so that a portion of said flange abuts the end of said stationary member to space said diaphragm from the end of said stationary member and a resiliently expansible lip carried by said flange and, having outer and inner surfaces inclined in its relaxed state inwardly with respect to said peripheral flange, said lip being operable to resiliently engage a portion of said stationary member to secure said boot thereto.

GEORGE D. McCARTHY.
ARTHUR H. EDWARDS.

REFERENCES CITED

The following references are of record in the file of this patent:

UNITED STATES PATENTS

| Number | Name | Date |
|---|---|---|
| 1,410,605 | Schacht | Mar. 28, 1922 |
| 1,711,206 | Oliver | Apr. 30, 1929 |
| 1,929,594 | Loughead | Oct. 10, 1933 |
| 1,943,679 | Le Cour et al. | Jan. 16, 1934 |
| 2,265,496 | Shaw | Dec. 9, 1941 |
| 2,398,910 | Pontius | Apr. 23, 1946 |

FOREIGN PATENTS

| Number | Country | Date |
|---|---|---|
| 17,990 | Great Britain | of 1902 |